United States Patent
Bragg et al.

(10) Patent No.: US 7,347,138 B2
(45) Date of Patent: Mar. 25, 2008

(54) BREW CHAMBER FOR A SINGLE SERVE BEVERAGE BREWER

(75) Inventors: Tim A. Bragg, Malden, MA (US); C. Anthony Lai, Burlington, MA (US); Richard B. Streeter, Winchester, MA (US)

(73) Assignee: Keurig, Incorporated, Wakefield, MA (US)

( * ) Notice: Subject to any disclaimer, the term of this patent is extended or adjusted under 35 U.S.C. 154(b) by 466 days.

(21) Appl. No.: 10/924,107

(22) Filed: Aug. 23, 2004

(65) Prior Publication Data

US 2005/0126400 A1    Jun. 16, 2005

Related U.S. Application Data

(63) Continuation-in-part of application No. 10/734,649, filed on Dec. 12, 2003, now Pat. No. 7,165,488.

(51) Int. Cl.
*A47J 31/00*   (2006.01)

(52) U.S. Cl. ........................ 99/289 R; 99/295

(58) Field of Classification Search ............ 99/295, 99/289 R, 302 R, 279, 300
See application file for complete search history.

(56) References Cited

U.S. PATENT DOCUMENTS

| | | | |
|---|---|---|---|
| 3,007,392 A | 11/1961 | Pecoraro et al. | |
| 4,581,239 A | 4/1986 | Woolman et al. | |
| 4,644,855 A | 2/1987 | Woolman et al. | |
| 4,738,378 A | 4/1988 | Oakley et al. | |
| 5,272,960 A | 12/1993 | Kinna | |
| 5,649,472 A | 7/1997 | Fond et al. | |
| 5,794,519 A | 8/1998 | Fischer | |
| 6,009,792 A | 1/2000 | Kraan | |
| 6,047,630 A | 4/2000 | Brown et al. | |
| 6,050,175 A | 4/2000 | Mirand et al. | |
| 6,490,966 B2 | 12/2002 | Mariller et al. | |
| 6,584,888 B2 | 7/2003 | Cortese | |
| 6,655,260 B2 | 12/2003 | Lazaris et al. | |
| 6,698,332 B2 | 3/2004 | Kollep et al. | |
| 6,725,762 B2 | 4/2004 | Kollep et al. | |
| 6,748,850 B1 | 6/2004 | Kraan | |
| 6,763,759 B2 | 7/2004 | Denisart | |
| 6,799,503 B2 | 10/2004 | Kollep et al. | |
| 6,857,352 B2 | 2/2005 | Fischer | |

(Continued)

FOREIGN PATENT DOCUMENTS

EP    0151252    8/1985

(Continued)

*Primary Examiner*—Reginald L. Alexander
(74) *Attorney, Agent, or Firm*—Wolf, Greenfield & Sacks P.C.

(57) ABSTRACT

A brew chamber for a single serve filter package. The chamber includes a receptacle having an open top, configured and dimensioned to receive the package. A frame for supporting the receptacle for pivotal movement about a first axis between a vertical brew position and a forwardly inclined open position. A lid is supported on the frame for pivotal movement about a second axis between a raised position allowing access to the open top when the receptacle is in the open position, and a lowered position closing the open top when the receptacle is in the brew position. The receptacle is linked to the lid such that the receptacle is pivoted between the brew and open positions in response to movement of the lid between the lowered and raised positions.

23 Claims, 11 Drawing Sheets

U.S. PATENT DOCUMENTS

| | | |
|---|---|---|
| 6,857,353 B2 | 2/2005 | Kollep et al. |
| 6,904,840 B1 | 6/2005 | Pfeifer et al. |
| 2002/0002913 A1 | 1/2002 | Mariller et al. |
| 2002/0124736 A1 | 9/2002 | Kollep et al. |
| 2004/0182248 A1 | 9/2004 | Fischer |
| 2005/0106288 A1 | 5/2005 | Blanc et al. |
| 2005/0132891 A1 | 6/2005 | Chen et al. |
| 2005/0235834 A1 | 10/2005 | Blanc et al. |

FOREIGN PATENT DOCUMENTS

| | | |
|---|---|---|
| EP | 0870457 A1 | 10/1998 |
| WO | WO-94/02059 | 2/1994 |
| WO | WO-98/20782 | 5/1998 |
| WO | WO-01/30218 A1 | 5/2001 |
| WO | WO 02/43541 A1 | 6/2002 |

# BREW CHAMBER FOR A SINGLE SERVE BEVERAGE BREWER

CROSS-REFERENCE TO RELATED APPLICATION

This application is a continuation-in-part of U.S. Ser. No. 10/734,649 filed on Dec. 12, 2003 now U.S. Pat. No. 7,165,488.

BACKGROUND OF THE INVENTION

1. Field of the Invention

This invention relates generally to single serve beverage brewers, and is concerned in particular with the provision of a novel and improved brew chamber for such brewers.

2. Description of the Prior Art

In known brew chambers for single serve beverage brewers, such as those disclosed for example in U.S. Pat. Nos. 5,325,765; 6,079,315; 6,142,063; and 6,606,938, a disposable beverage filter cartridge is pierced by inlet and outlet probes to accommodate a through flow of metered hot water. The hot water infuses a dry beverage medium contained in the cartridge to thereby produce a single serving of the beverage.

The brew chambers are opened and closed by automatically operable mechanisms that have proven to be reliable, although relatively complex and expensive.

Other beverage brewers of the type disclosed for example in WO 02/43541 A1 have brew chambers that are opened and closed manually, but these also employ unduly complicated operating mechanisms.

Moreover, the prior art brew chambers, be they automatically or manually operated, suffer from an added disadvantage in that their cartridge or pod receptacles remain vertical and thus inconveniently oriented when the chambers are opened.

There exists a need, therefore, for an improved beverage chamber that has a relatively simple and inexpensive operating mechanism, with the capability, when opened, of presenting the cartridge receptacle in a forwardly inclined position, thus enhancing its accessibility during both insertion of fresh cartridges and retrieval of spent cartridges.

SUMMARY OF THE INVENTION

A brew chamber in accordance with the present invention has a receptacle with an open top configured and dimensioned to receive a beverage filter cartridge. A fixed frame supports the receptacle for pivotal movement about a first axis between a vertical brew position and a forwardly inclined open position. A lid is supported on the frame for pivotal movement about a second axis between a raised position allowing access to the forwardly inclined open receptacle, and a lowered position closing the receptacle in its vertical brew position. The first and second axes are parallel. A linkage connects the receptacle to the lid and serves to pivotally manipulate the receptacle between its open and brew positions in response to movement of the lid between its raised and lowered positions.

These and other features and advantages of the present invention will now be described in greater detail with reference to the accompanying drawings, wherein:

DETAILED DESCRIPTION OF PREFERRED EMBODIMENTS

Figure 1:
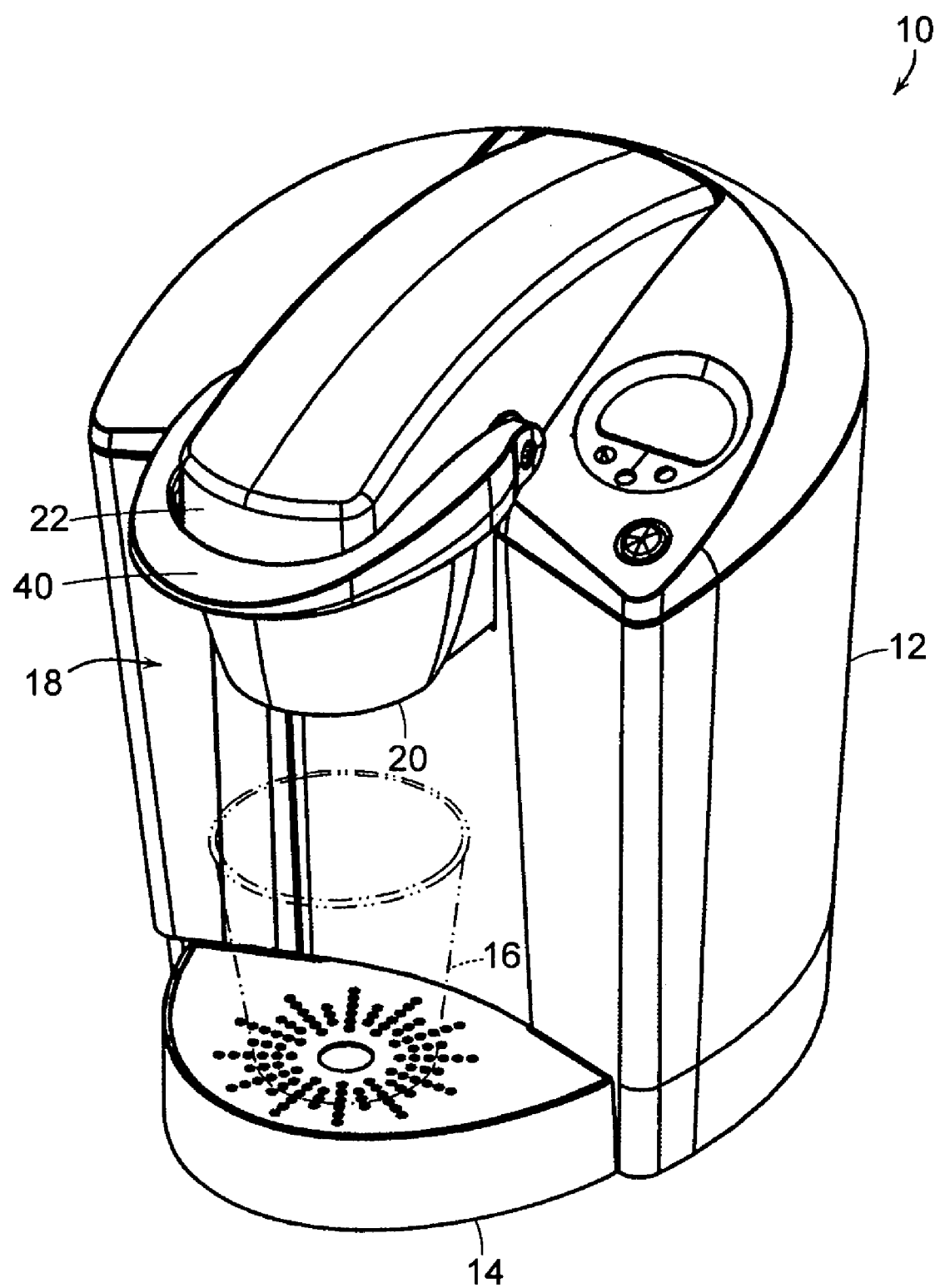
FIG. 1 is a front perspective view of a single serve beverage brewer, with a brew chamber in accordance with the present invention shown in its closed condition.
Figure 2:
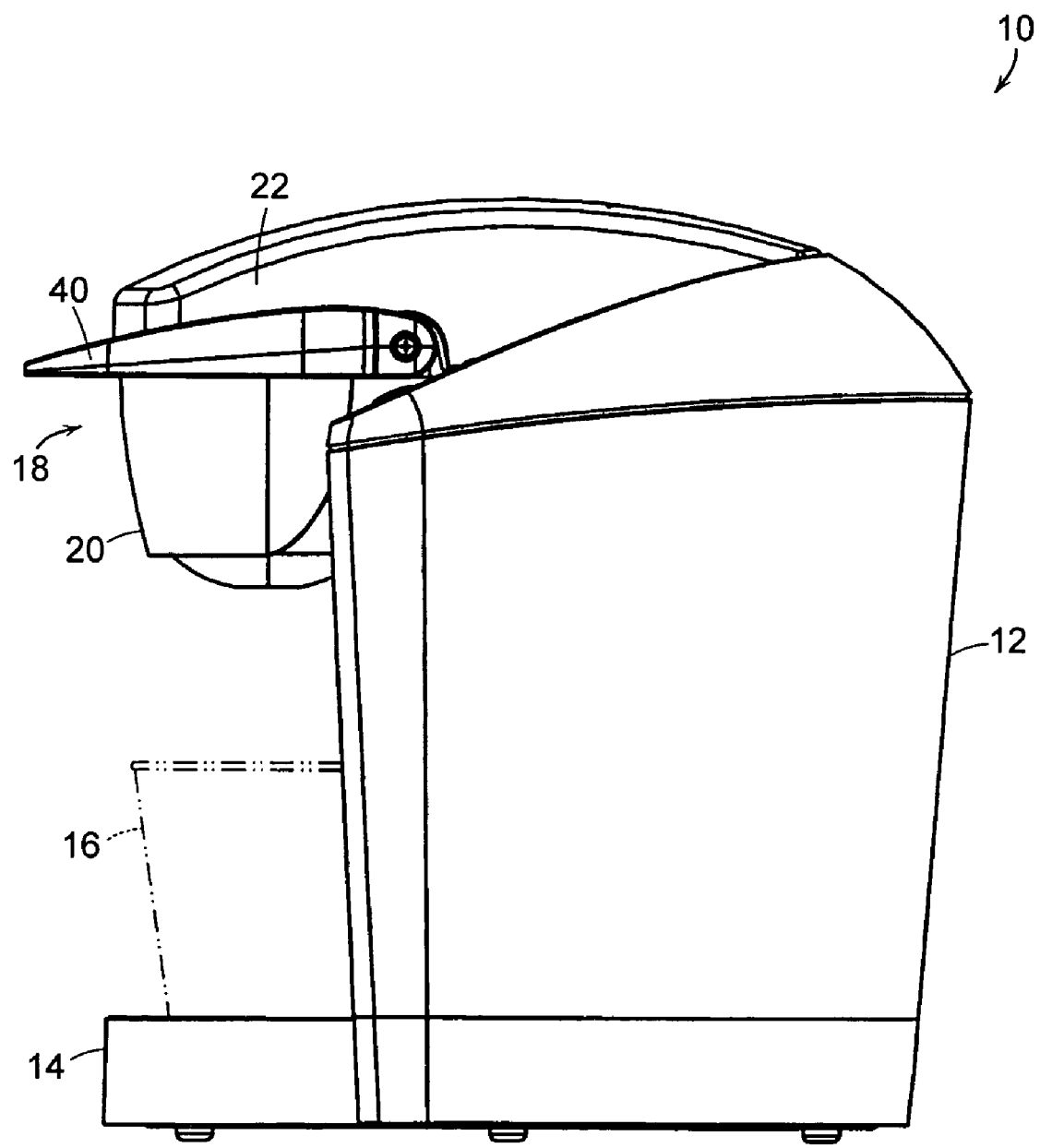
FIG. 2 is a side elevational view of the brewer as shown in FIG. 1.

With reference initially to FIGS. 1-4, a single serve beverage brewer is shown at 10 having a housing 12 with a forwardly protruding shelf 14 arranged to support a cup 16 for the brewed beverage.

The housing 12 contains components conventionally included in brewers of this type, including, inter alia, a water tank, heater, pump, electronic controls, etc. These are well known to those skilled in the art, and thus have not been illustrated, nor will they be described further in this specification. Suffice it to say that these components coact in response to the user's command to deliver a metered amount of heated water to a brew chamber generally indicated at 18.

The brew chamber includes a cartridge receptacle 20 and a lid 22. The receptacle has an open top configured and dimensioned to receive a beverage filter cartridge 24 (see FIGS. 3 and 4). The cartridge 24 is preferably of the type disclosed, for example, in U.S. Pat. No. 5,840,189, the description of which is herein incorporated by reference. Cartridge 24 includes an impermeable piercable outer container internally subdivided by a filter element into two compartments, one of which contains a dry beverage medium. Alternatively, the brew chamber could be employed to process beverage pods that typically are structured with soluble beverage materials confined between top and bottom filter media.

With reference additionally to FIGS. 5-9 and 11, the brew chamber 18 includes a frame structure 26 secured in any known manner within the brewer housing 12.

Figure 3:
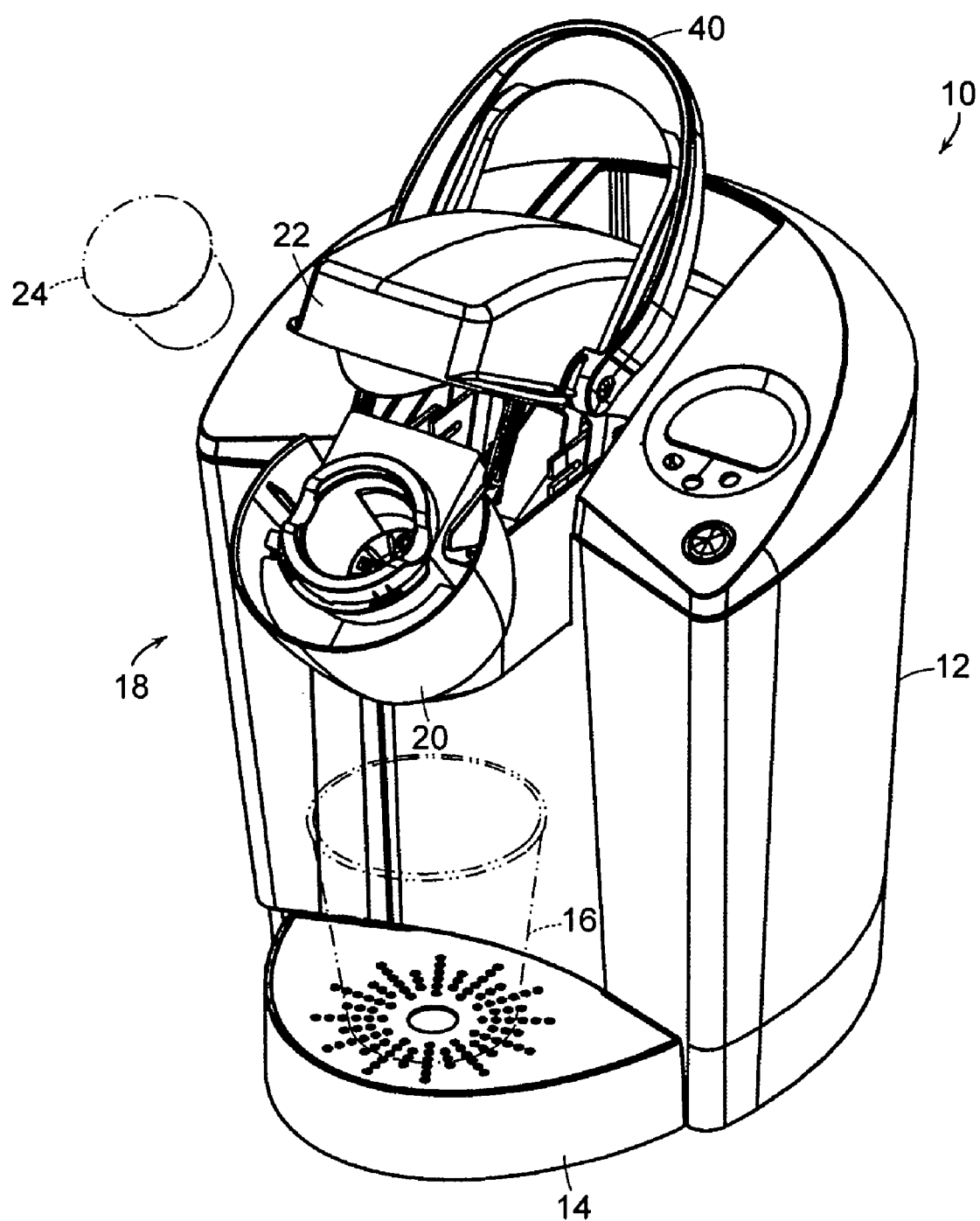
FIG. 3 is a view similar to FIG. 1 showing the brew chamber in its open condition.
Figure 4:
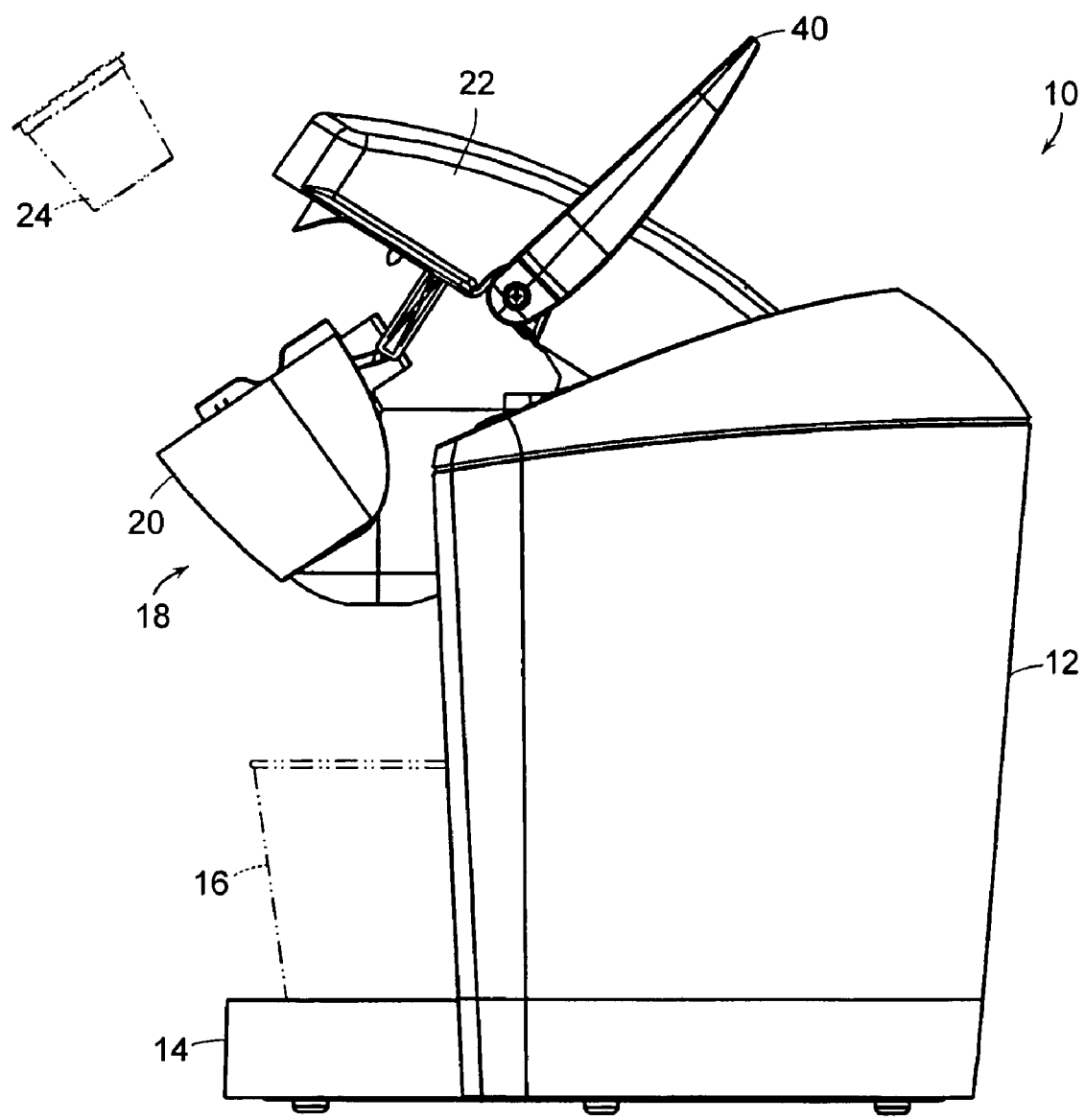
FIG. 4 is a side elevational view of the brewer as shown in FIG. 3.
Figure 5:
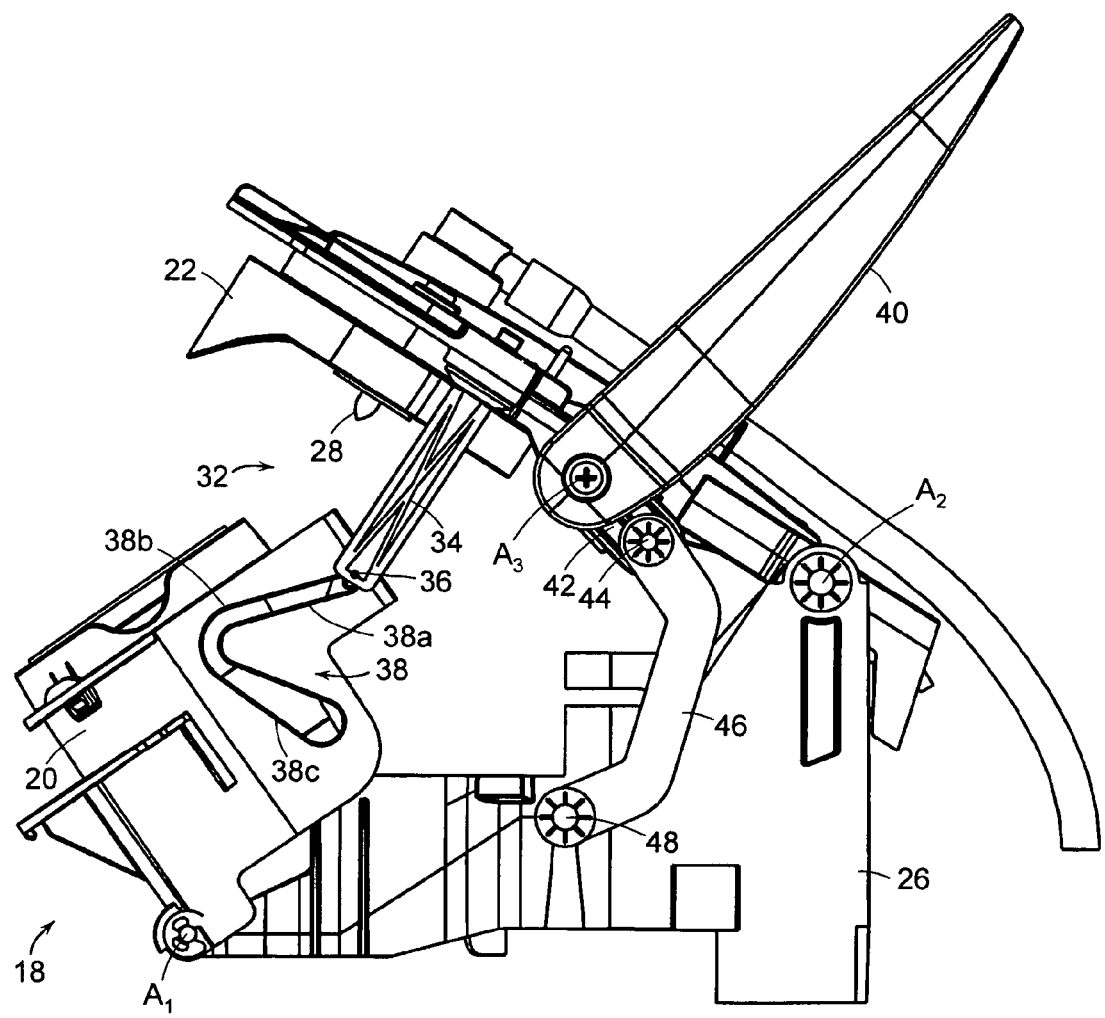
FIG. 5 is a side view of the brew chamber and its operating mechanism removed from the brewer housing, the chamber being shown open.

The receptacle 20 is supported by the frame structure for pivotal movement about a first axis $A_1$ between a vertical brew position, as shown in FIGS. 1, 2, 8 and 9, and a forwardly inclined open position, as shown in FIGS. 3, 4 and 5.

Figure 6:
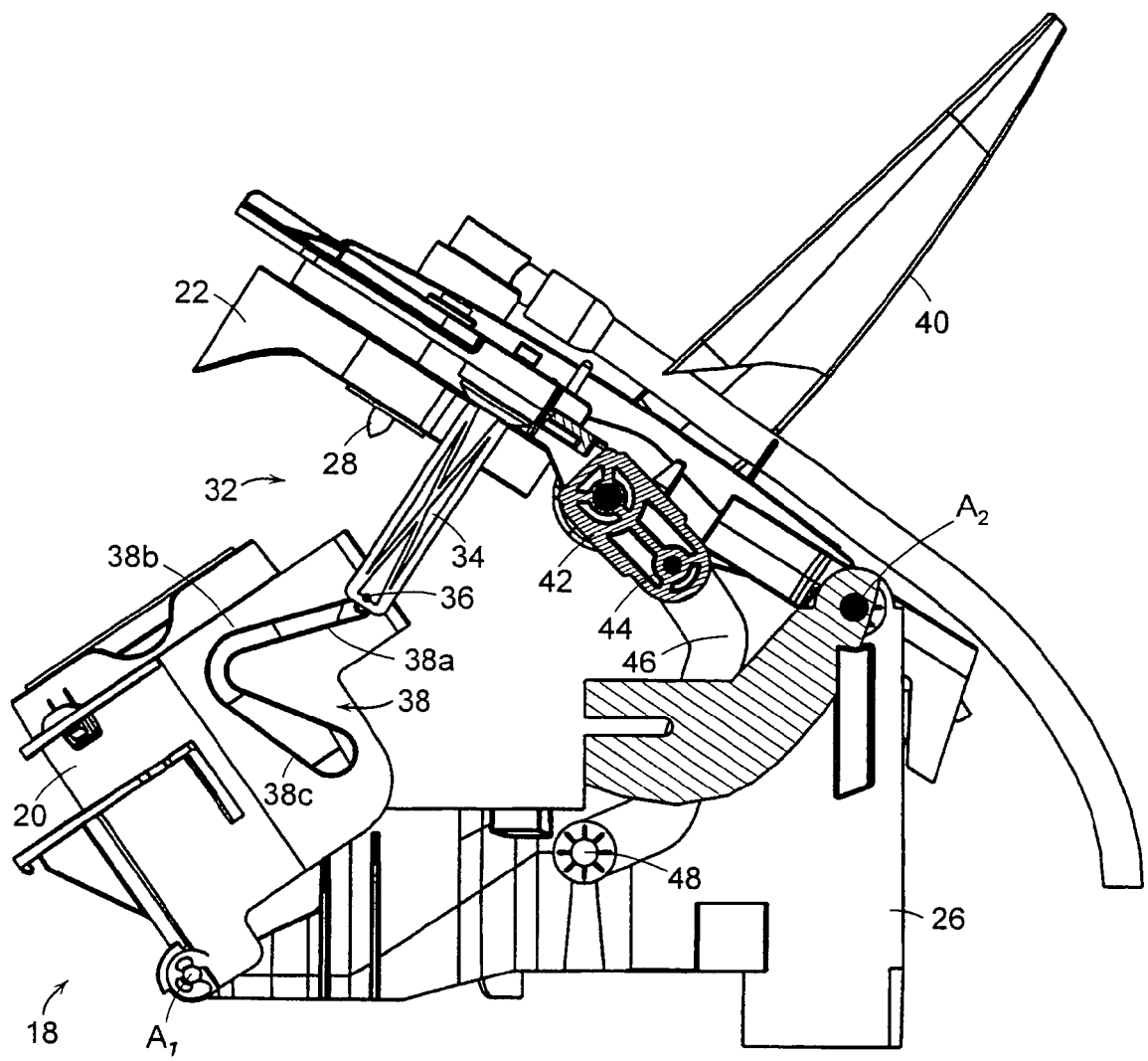
FIG. 6 is a view similar to FIG. 5 with portions broken away.
Figure 7:
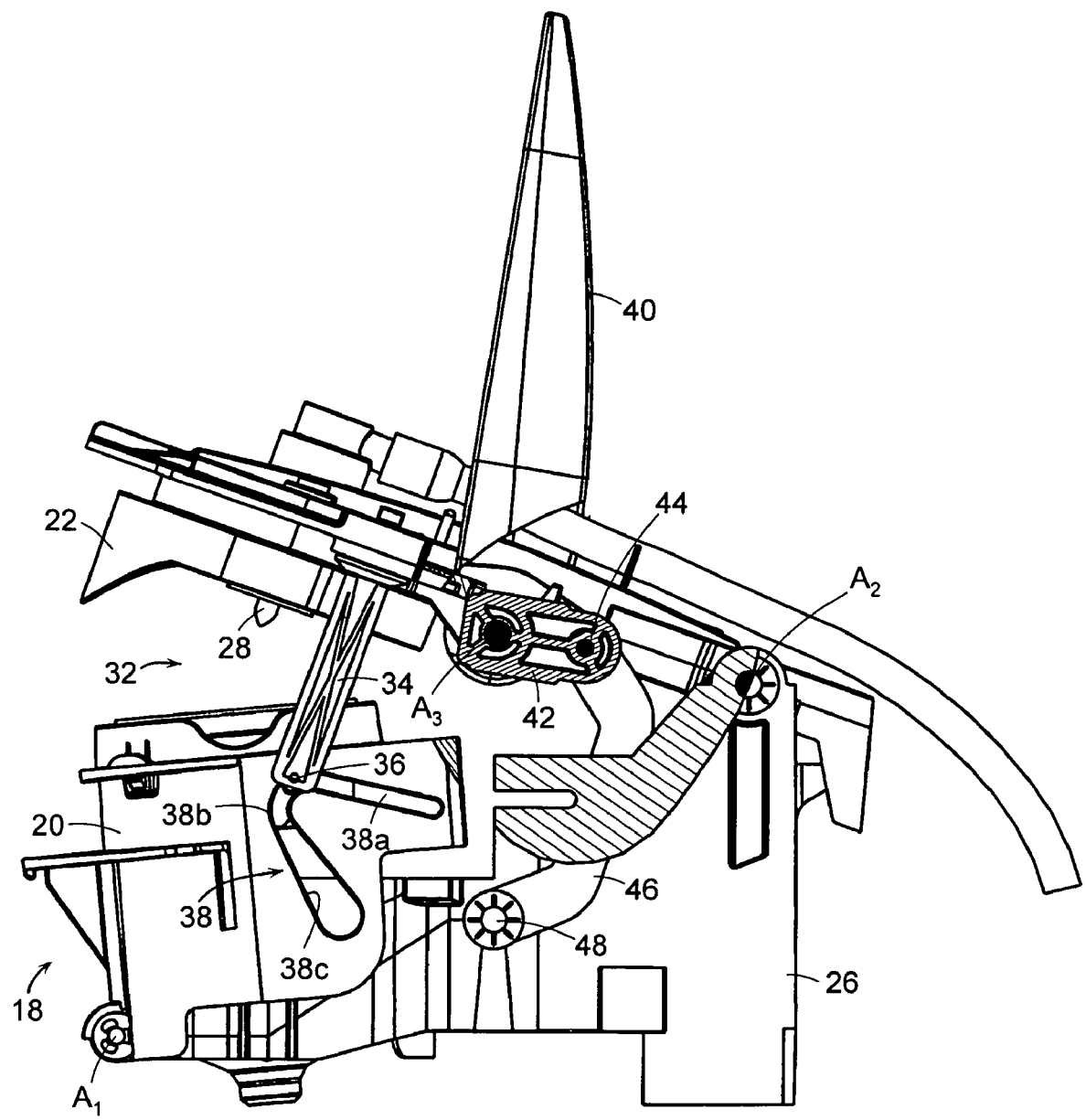
FIGS. 7-9 are views similar to FIG. 6 showing the brew chamber at successive stages during closure.
Figure 8:
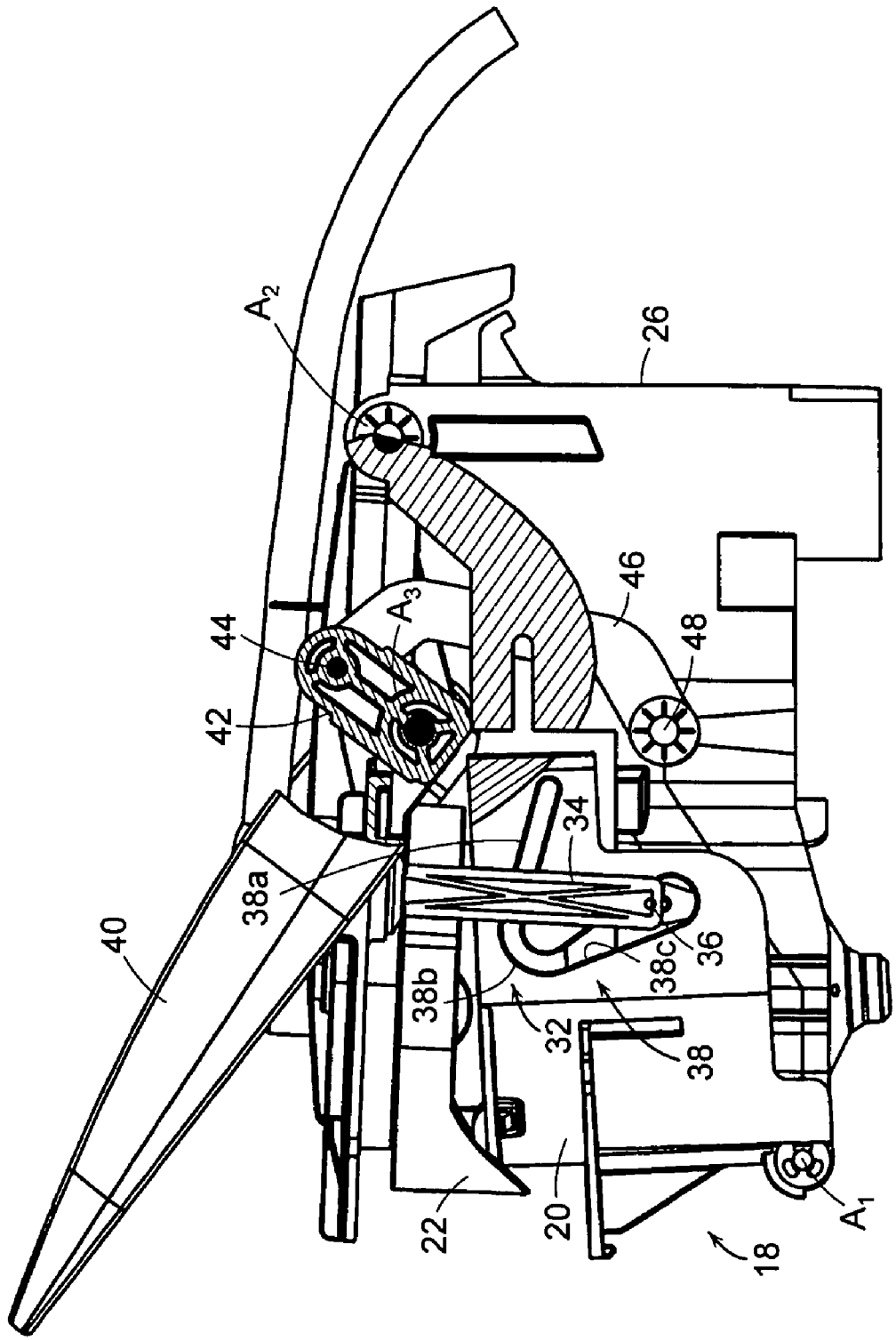

The lid 22 is supported by the frame structure 26 for pivotal movement about a second axis $A_2$ between a lowered closed position, again as shown in FIGS. 1, 2, 8 and 9, and a raised open position as shown in FIGS. 3, 4 and 5. The raised lid allows access to the forwardly inclined receptacle 20 for convenient insertion and removal of a beverage filter cartridge 24. The lowered lid closes and cooperates with the receptacle to enclose the filter cartridge during the brew cycle. As shown in FIGS. 5-7, the lid carries an inlet probe 28 and as shown in FIG. 7, the base of the receptacle includes an outlet probe 30. The probes pierce the beverage filter cartridge as the lid is lowered to its closed position, thus accommodating a through flow of heated water into the cartridge via the inlet probe for infusion with the beverage medium contained in the cartridge, with the resulting brewed beverage exiting via the outlet probe for delivery to the underlying cup 16. As mentioned previously, a beverage pod could be employed alternatively, with water flowing into the brew chamber via an inlet port or ports rather than an inlet probe, with the brewed beverage exiting the brew chamber via an outlet port or ports.

As can be seen in FIGS. 5-9 and 11, a linkage generally indicated at 32 connects the receptacle 20 to the lid 22 and serves to pivot the former about axis A between its vertical brew and forwardly inclined positions in response to movement of the latter between its lowered and raised positions. The linkage includes arms 34 fixed at their upper ends to the lid 22, and carrying pins 36 at their lower ends. The pins 36 are positioned to ride in contoured slots 38 in opposite sides of the receptacle 20. The slots 38 have upper substantially straight segments 38a communicating at bends 38b with rearwardly inclined and somewhat enlarge lower segments 38c.

A generally U-shaped operating handle 40 has its ends fixed to generally perpendicular crank arms 42 which in turn are connected to the lid 22 for pivotal movement about a third axis $A_3$ parallel to the first and second axes $A_1$, $A_2$. The crank arms 42 pivotally connected as at 44 to links 46 which in turn are pivotally connected as at 48 to the frame structure 26.

When the receptacle 20 is in its forwardly inclined open position as shown in FIG. 5, the operating handle 40 is at an angle of approximately 90° with respect to the lid 22, and the pins 36 on arms 34 are at the rearmost ends of the straight slot segments 38a.

As the handle 40 is pivoted forwardly about axis $A_3$ (FIG. 6), the pins 36 on arms 34 progress around the slot bends 38b, pivotally urging the receptacle about axis $A_1$ rearwardly from its forwardly inclined position. Simultaneously, the cooperative pivotal action of the crank arms 42 and links 46 causes the lid 22 to be pivotally lowered about axis $A_2$.

Figure 9:
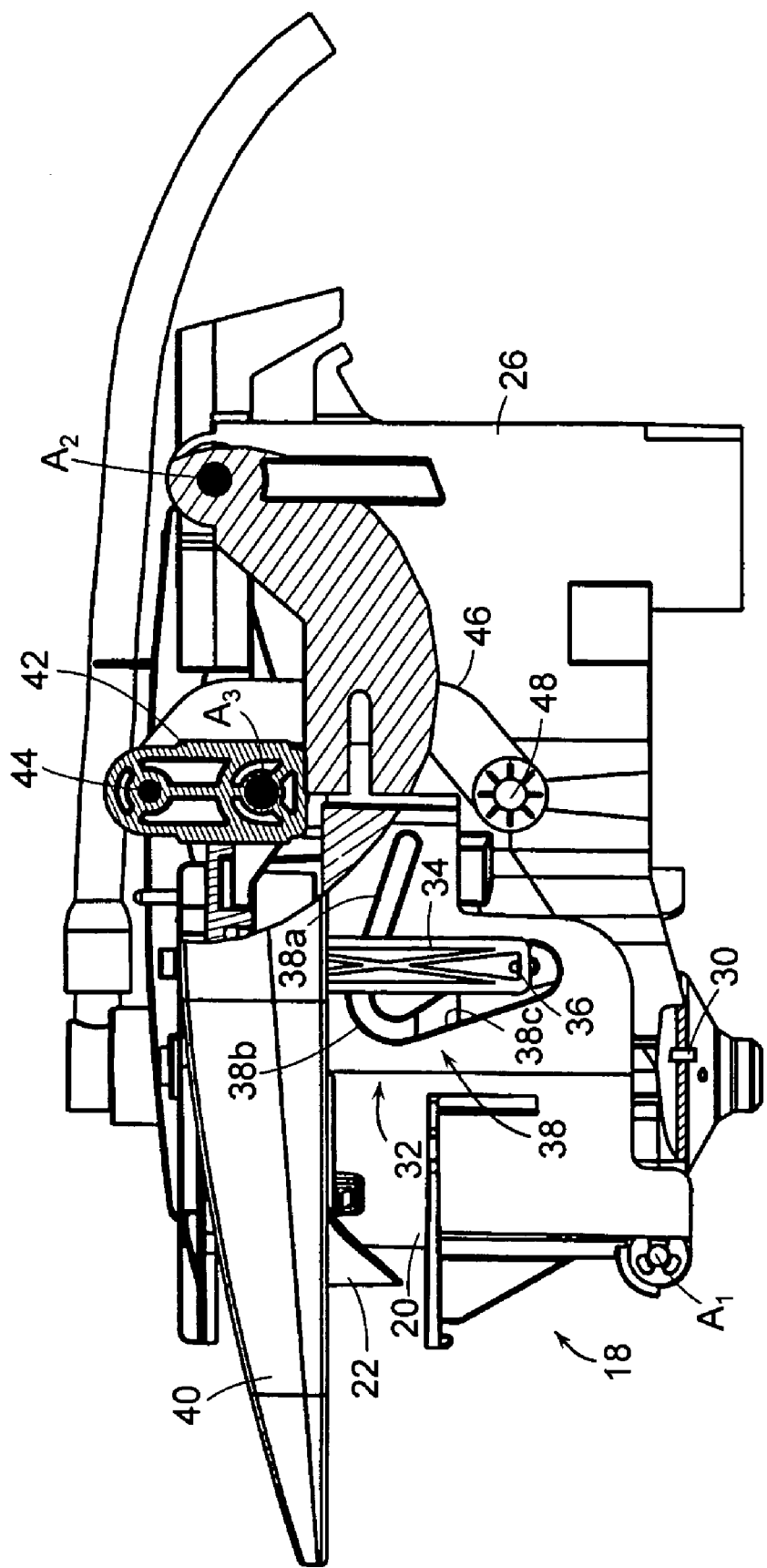

At the closed position shown in FIG. 9, the pins 36 on arms 34 have reached the lower ends of the slots 38, and the operating handle 40 is substantially parallel to the fully lowered lid 22.

Figure 10:
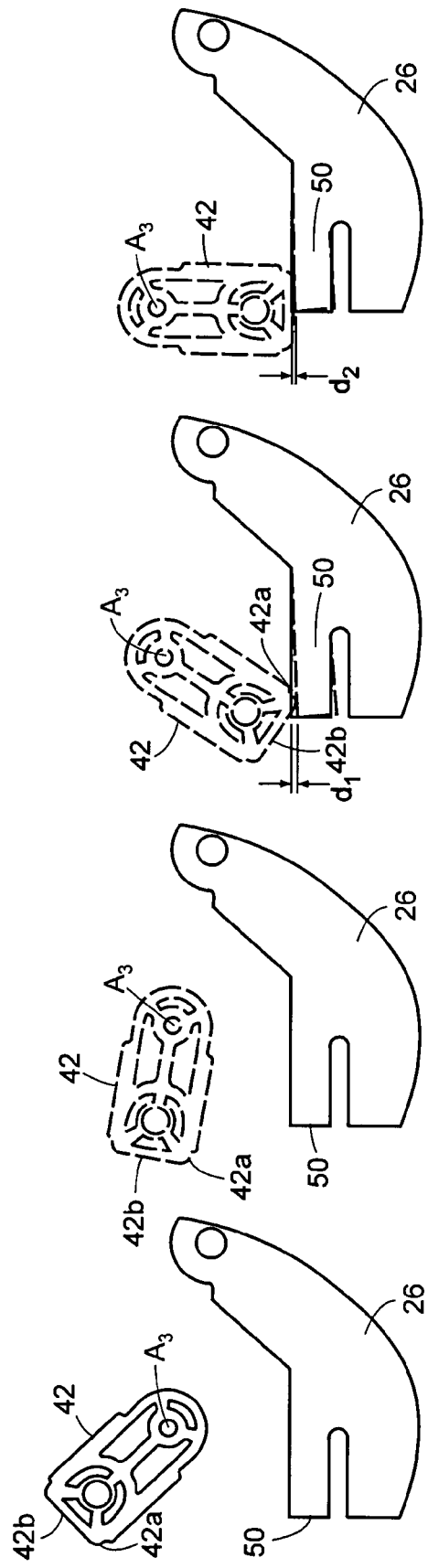
FIGS. 10a-10d are views showing the coaction between linkage arms and resilient elements of the frame during pivotal movement of the handle between its open and closed positions.
Figure 11:
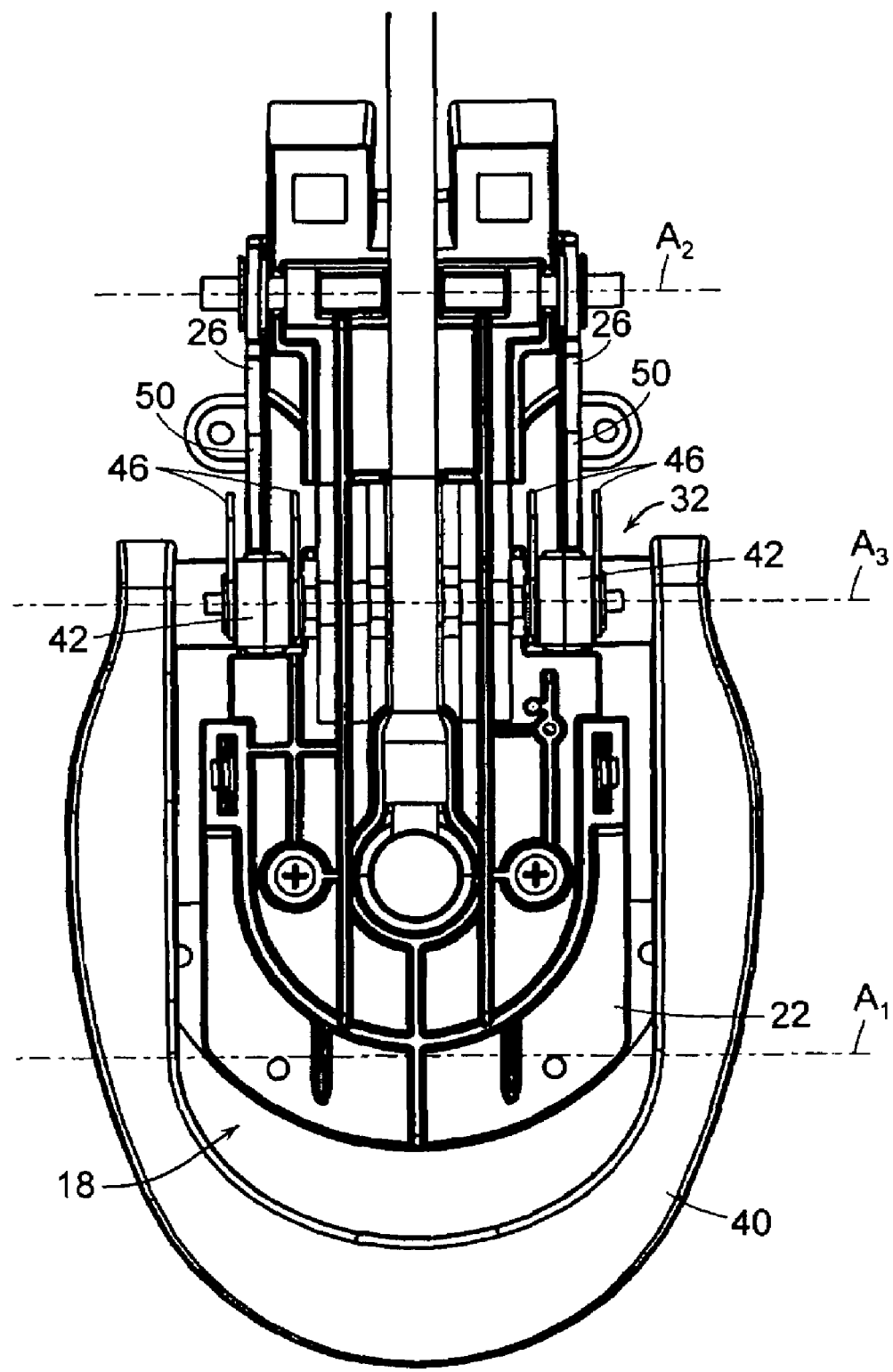
FIG. 11 is a top plan view of the closed brew chamber.

Frame 26 includes resilient elements 50 configured and arranged to coact with the crank arms 42 in providing an "over the center" yieldable tactile resistance to pivotal movement of the handle 40 between its open and closed positions. More particularly, and with reference to FIGS. 10a-10d, which coincide respectively with FIGS. 6-9, it will be seen that the crank arms 42 pivot together with handle 40 about axis $A_3$. At the position shown in FIGS. 8 and 10c, corners 42a of the crank arms contact and downwardly deflect resilient elements 50 through an initial distance $d_1$, thus providing tactile resistance to continued handle movement. When the lid is finally closed, and as shown in FIG. 10d, the flat bottoms 42b of the crank arms rest against the upper edges of the resilient elements, the latter having sprung back slightly but remaining downwardly deflected by a reduced distance $d_2$. The handle 40 is thus resiliently held downwardly in its closed position, thus providing a positive indication of chamber closure.

In light of the foregoing, it will now be understood that the mechanism of the present invention is relatively simple, involving as major components the receptacle 20, lid 22 and handle 40 respectively mounted for pivotal movement about parallel axes $A_1$, $A_2$ and $A_3$. The brew chamber 18 can accommodate various types of disposable filter packages, including the filter cartridge 24 shown in the drawings, as well as filter pods. When the brew chamber is opened, the receptacle is inclined forwardly to facilitate insertion of fresh filter packages and removal of spent filter packages.

We claim:

1. An apparatus for forming a beverage, comprising:
   a housing adapted to support components of a beverage forming device;
   a receptacle movable relative to the housing between a vertical position and an inclined position in which the receptacle is accessible to insert or remove a beverage cartridge;
   a lid that covers at least part of the receptacle when the receptacle is in the vertical position;
   a handle that is movable between open and closed positions to cause the receptacle to move between the vertical and inclined positions; and
   at least one resilient element arranged to resiliently hold the handle in the closed position, wherein the at least one resilient element remains deflected when the handle is in the closed position.

2. The apparatus of claim 1, wherein the at least one resilient element includes a portion of the housing.

3. The apparatus of claim 2, wherein the at least one resilient element includes a cantilevered portion of the housing.

4. The apparatus of claim 1, wherein a portion attached to the handle contacts the at least one resilient element as the handle is moved to the closed position.

5. The apparatus of claim 1, wherein the lid is movable between an open position and a closed position in which the lid cooperates with the receptacle in the vertical position to at least partially enclose a beverage cartridge carried by the receptacle.

6. The apparatus of claim 5, wherein movement of the handle between the open and closed positions causes the lid to move between the open and closed positions.

7. The apparatus of claim 6, wherein the at least one resilient member includes a portion of the housing.

8. The apparatus of claim 1, further comprising:
   at least one arm attached to the handle; and
   at least one link pivotally mounted to the housing and pivotally mounted to the at least one arm.

9. The apparatus of claim 8, wherein movement of the handle causes movement of the at least one arm.

10. The apparatus of claim 9, wherein the handle is pivotally mounted to the lid and is fixed relative to the at least one arm.

11. The apparatus of claim 10, wherein a portion of the at least one arm contacts the resilient member as the handle is moved to the closed position.

12. The apparatus of claim 1, wherein the lid is movable relative to the housing, the apparatus further comprising a linkage that causes movement of the receptacle in response to movement of the lid.

13. The apparatus of claim 12, wherein movement of the handle causes movement of the lid.

14. The apparatus of claim 12, wherein the linkage includes at least one pin attached to the lid that engages with a slot formed in the receptacle.

15. The apparatus of claim 1, wherein the lid is movable between an open position and a closed position, the apparatus further comprising an inlet probe that is arranged to pierce a beverage cartridge in the receptacle when the lid is moved to the closed position.

16. The apparatus of claim 15, wherein the receptacle is arranged to receive a filter pod.

17. The apparatus of claim 15, further comprising an outlet probe arranged to pierce a beverage cartridge in the receptacle to allow a beverage to exit the cartridge.

18. The apparatus of claim 1, further comprising a beverage cartridge that includes a beverage medium and a filter element.

19. The apparatus of claim 1, wherein the lid is movable between an open position and a closed position, and wherein the lid and receptacle move simultaneously in at least part of their respective movement between the open and closed, and vertical and inclined positions.

20. The apparatus of claim 1, constructed and arranged to produce a brewed beverage.

21. The apparatus of claim 1, wherein the receptacle is movable between a vertical position and a forwardly inclined position.

22. An apparatus for forming a beverage, comprising:

a housing adapted to support components of a beverage forming device;

a receptacle movable relative to the housing between a vertical position and an inclined position in which the receptacle is accessible to insert or remove a beverage cartridge;

a lid that covers at least part of the receptacle when the receptacle is in the vertical position;

a handle that is movable between open and closed positions to cause the receptacle to move between the vertical and inclined positions; and at least one resilient element arranged to resiliently hold the handle in the closed position, wherein the at least one resilient element, when deflected, urges the lid and the receptacle apart relative to one another.

23. The apparatus of claim 22, wherein a portion attached to the handle contacts the at least one resilient element as the handle is moved to the closed position.

\* \* \* \* \*